United States Patent [19]

Fujii et al.

[11] Patent Number: 5,266,387
[45] Date of Patent: Nov. 30, 1993

[54] WRAPPING FILM

[75] Inventors: Toshio Fujii; Toyomitsu Kondo, both of Kurashiki, Japan

[73] Assignee: Mitsubishi Kasei Corporation, Tokyo, Japan

[21] Appl. No.: 797,140

[22] Filed: Nov. 25, 1991

[30] Foreign Application Priority Data

Nov. 26, 1990 [JP] Japan ................................. 2-321605
Feb. 4, 1991 [JP] Japan ................................. 3-13550
Feb. 6, 1991 [JP] Japan ................................. 3-15547
Oct. 29, 1991 [JP] Japan ................................. 3-283346

[51] Int. Cl.$^5$ .......................... B32B 7/02; B32B 27/08
[52] U.S. Cl. .................................. 428/213; 428/220; 428/476.3; 428/476.9
[58] Field of Search ............... 428/458, 476.3, 220, 428/348, 480, 213, 476.9

[56] References Cited

U.S. PATENT DOCUMENTS

| | | | |
|---|---|---|---|
| 4,189,420 | 2/1980 | Sugimoto et al. | 524/308 |
| 4,944,970 | 7/1990 | Stenger et al. | 428/34.8 |
| 5,061,554 | 10/1991 | Hjortsberg et al. | 428/480 X |

FOREIGN PATENT DOCUMENTS 2295840  7/1976  France .

OTHER PUBLICATIONS

World Patents Index Latest, Week 4291, Derwent Publications, Ltd., London, GB; AN 91-305711 and JP-A-3 202 346 (Mitsubishi Kasei Corp) Sep. 4, 1991.
World Patents Index Latest, Week 3691, Derwent Publications, Ltd., London, GB; AN 91-264351 and JP-A-3 175 030 (Mitsubishi Kasei Corp.) Jul. 30, 1991.
World Patents Index, Week 1179, Derwent Publications, Ltd., London, GB; AN 79-20792B and JP-A-54 015 980.
JP-B-55-46663 corresponding to U.S. Pat. No. 4,189,420, Nov. 1980.
JP-A-51-65483, Jun. 1976.
JP-A-1-196338, Aug. 1989.
JP-A-2-160555, Jun. 1990.
European Search Report, No. 91 120199, Apr. 1992.

*Primary Examiner*—Thomas J. Herbert, Jr.
*Attorney, Agent, or Firm*—Sughrue, Mion, Zinn, Macpeak & Seas

[57] ABSTRACT

A wrapping film comprising at least an outer layer, an interlayer, and an inner layer in this order, (a) the wrapping film having a shear peel strength of 0.20 kg/cm$^2$ or more and a 180° peel strength of 8.0 g/50 mm or less, (b) the outer layer and the inner layer each being a polyolefin resin composition layer, (c) the interlayer being an aliphatic polyamide resin layer, (d) the wrapping film exhibiting a tensile elongation at break of 200% or less in the direction of film withdrawal and a tensile elongation at break of 80% or more in the direction perpendicular to the direction of film withdrawal, (e) the ratio of the tensile elongation at break in the direction of film withdrawal to that in the direction perpendicular to the direction of film withdrawal being in the range of 0.7 or less, and (f) the total thickness of the wrapping film being in the range of 40 μm or less, and the thickness of the interlayer is in the range of 10 to 90% of the total thickness of the wrapping film.

20 Claims, No Drawings

WRAPPING FILM

FIELD OF THE INVENTION

The present invention relates to a wrapping film for use in food wrapping, etc. More particularly, the present invention relates to an oriented laminated film suitable for wrapping, which exhibits excellent cuttability, transparency, heat resistance, adhesion, steam barrier properties, anti-heat shrinkage properties and food sanitation.

BACKGROUND OF THE INVENTION

As wrapping films for use in food wrapping there have been known films made of polyvinylidene chloride, polyethylene or polyvinyl chloride as main raw material.

However, polyvinylidene chloride films are disadvantageous in that they shrink drastically under heating. Polyethylene films are disadvantageous in that when they come into contact with oily foods (e.g., cooked meat, tempura) and are heated, they melt. Polyvinyl chloride films are disadvantageous in that when they come into contact with boiled water, they undergo whitening.

On the other hand, as heat-resistant resins suitable for wrapping film there have been known aliphatic polyamide resins. Aliphatic polyamide resins exhibit excellent heat resistance and mechanical strength. However, since aliphatic polyamide resins have a high hygroscopicity, they can hardly maintain their inherent physical properties. In particular, nylon-6 and copolymer nylons such as nylon-6/6,6 and nylon-6/6,10 are disadvantageous in that $\epsilon$-caprolactam as monomer component bleeds to the film surface. Therefore, the application of these aliphatic polyamide resins to food wrapping is restricted for sanitary reasons.

These wrapping films also have a cuttability problem. Wrapping films are normally served with a case such as paper tube. For use, the wrapping films are pulled to a proper length, and then cut by a cutting blade mounted thereon.

As such a cutting blade there is normally used a simple blade obtained by punching a saw blade from an iron plate having a thickness of about 0.2 mm. As the case supporting this cutting blade there is used a paper box made of a coated board with a basis weight of 350 to 700 g/m$^2$. Such a material has an extremely low rigidity.

Wrapping films are required to be easily cut according to the user's will even with such a simple cutting mechanism. In practice, however, the case or cutting blade is subject to deformation, and the film is also subject to deformation. The film is thus often cut at a position out of the cutting blade. Specifically, when the prior art polyvinylidene chloride films have a tear somewhere upon cutting, this tear extends, causing the film to be cut obliquely, not along the cutting blade. Further, when they are cut, the prior art polyethylene films require a substantial pulling force that may not only cause the case to bent but also cause the film to be deformed.

SUMMARY OF THE INVENTION

It is therefore an object of the present invention to provide a wrapping film excellent in cuttability, transparency, heat resistance, adhesion, steam barrier properties, non-thermal shrinkability and food sanitation which eliminates these difficulties without impairing the inherent properties (heat resistance and mechanical strength) of polyamide resins.

Other objects and effects of the present invention will become apparent from the following detailed description and examples.

The present inventors have made extensive studies to produce such a wrapping film. As a result, it was found that by stretching an aliphatic polyamide resin, which has laminated on both sides thereof a polypropylene resin composition with a specific formulation, in the direction of film withdrawal, these difficulties can be eliminated, and a wrapping film excellent in cuttability, transparency, heat resistance, adhesion, steam barrier properties, non-thermal shrinkability and food sanitation can be obtained without impairing the inherent properties (heat resistance and mechanical strength) of polyamide resins. Thus, the present invention has been accomplished.

The present invention relates to a wrapping film comprising at least an outer layer, an interlayer, and an inner layer in this order, in which (a) the wrapping film has a shear peel strength of 0.20 kg/cm$^2$ or more and a 180° peel strength of 8.0 g/50 mm or less, (b) the outer layer and the inner layer each are a polyolefin resin composition, (c) the interlayer is an aliphatic polyamide resin layer, (d) the wrapping film exhibits a tensile elongation at break of 200% or less in the direction of film withdrawal and a tensile elongation at break of 80% or more in the direction perpendicular to the direction of film withdrawal, (e) the ratio of the tensile elongation at break in the direction of film withdrawal to that in the direction perpendicular to the direction of film withdrawal is in the range of 0.7 or less, and (f) the total thickness of the wrapping film is in the range of 40 $\mu$m or less, and the thickness of the interlayer is in the range of 10 to 90% of the total thickness of said wrapping film.

DETAILED DESCRIPTION OF THE INVENTION

The present invention will be further described hereinafter.

The wrapping film of the present invention is composed of a laminated film comprising at least three resin layers, i.e., outer layer, interlayer and inner layer.

The wrapping film of the present invention has a shear peel strength of 0.20 kg/cm$^2$ or more, preferably 0.40 kg/cm$^2$ or more, and a 180° peel strength of 8.0 g/50 mm or less, preferably 4.0 g/50 mm or less. For the measurement of shear peel strength and 180° peel strength, two sheets of wrapping films of the present invention are superimposed and then peeled off each other.

If the shear peel strength falls below 0.20 kg/cm$^2$, the resulting adhesion is disadvantageously insufficient. If the 180° peel strength exceeds 8.0 g/50 mm, the film tends to become too sticky and thus can hardly be peeled off the material.

In the laminated film, the outer layer and the inner layer each are a polyolefin resin composition layer.

The polyolefin resin composition used in the present invention may arbitrarily selected as long as it exhibits surface properties that provide the above-described share peel strength and 180° peel strength.

Specific preferred examples of such a polyolefin resin composition include a polypropylene composition comprising (A) 100 parts by weight of a polypropylene resin, (B) 3 to 30 parts by weight of a polybutene or polyisobutylene, and optionally (C) 0.2 to 5 parts by weight of a polyglycerin aliphatic ester or a monoglyceride containing a $C_{8-22}$ acyl group (an acyl group having 8 to 22 carbon atoms).

The polypropylene resin composition will be further described hereinafter. The polypropylene resin as Component (A) is blended in the polyolefin resin composition in a larger amount than Components (B) and (C) and is used as a base for the composition. As the polypropylene resin there can be used a propylene homopolymer or a copolymer of propylene with a small amount of other copolymerizable components (e.g., ethylene, butene). Examples of the propylene homopolymer include isotactic polypropylene, syndiotactic polypropylene, and atactic polypropylene. Preferred among these propylene homopolymers is isotactic polypropylene. As the copolymer of propylene with other copolymerizable components there can be used either random copolymer or block copolymer. The physical properties of the polypropylene resin as Component (A) can be properly selected depending on the purpose and conditions of use. In general, the polypropylene resin used in the present invention preferably exhibits a melt flow rate (MFR) of 0.5 to 20 g/10 min. (as determined at a temperature of 230° C. and a load of 2.16 kg in accordance with JIS K 6758) and a density of 0.89 to 0.91 g/cm$^3$.

The polybutene or polyisobutylene as Component (B) of the present invention serves as a thickening agent to provide the film with an excellent adhesion. The added amount of the polybutene or polyisobutylene is generally in the range of 3 to 30 parts by weight, preferably 5 to 20 parts by weight based on 100 parts by weight of the polypropylene resin as Component (A). If this value falls below 3 parts by weight, the resulting adhesion tends to be insufficient. If this value exceeds 30 parts by weight, the resulting excessive bleeding may cause sticking and a reduction in heat resistance. The physical properties of the polybutene or polyisobutylene can be properly determined depending on the added amount, the kind of the other components, the purpose, etc. and is not particularly limited. In general, the polybutene or polyisobutylene preferably exhibits a number-average molecular weight of 400 to 3,000.

When used in combination with the polybutene or polyisobutylene as Component (B), the polyglycerin aliphatic ester or monoglyceride containing the $C_{8-22}$ group as Component (C) to be added optionally serves to increase the adhesion of the film.

The polyglycerin aliphatic ester includes a compound obtained by esterification of at least one of hydroxyl groups in condensation polymer of glycerin with the $C_{8-22}$ higher aliphatic acid. The polymerization degree of the condensation polymer of glycerin is generally in the range of 2 to 10, preferably 2 to 6. The number of esterified hydroxyl groups in the hydroxyl groups in the condensation polymer of glycerin is 1 or more, preferably 1 to a number that is 70% of the total number of hydroxyl groups, more preferably 1 to a number that is 60% of the total number of hydroxyl groups. The higher aliphatic acid may be a saturated or unsaturated $C_{8-22}$, more preferably $C_{10-18}$ aliphatic acid. Examples of polyglycerin aliphatic ester include diglycerin monolaurate, diglycerin monopalmitate, diglycerin monooleate, diglycerin monostearate, diglycerin dioleate, and triglycerin monooleate.

The monoglyceride containing the $C_{8-22}$ acyl group includes a compound obtained by esterification of one of three hydroxyl groups in glycerin with $C_{8-22}$ higher aliphatic acid (hereinafter referred to as "monoglyceride"). The higher aliphatic acid may be a saturated or unsaturated $C_{8-22}$, preferably $C_{10-18}$ higher aliphatic acid. Specific examples of such a higher aliphatic acid include monolauryl glycerin, monopalmityl glycerin, monooleyl glycerin, and monostearyl glycerin.

Two or more of these polyglycerin aliphatic esters or monoglycerides may be used in combination of two or more thereof. The added amount of Component (C), if it is used, is in the range of 0.2 to 5 parts by weight based on 100 parts by weight of the polypropylene resin as Component (A). If this value falls below 0.2 parts by weight, Component (C) exhibits less synergistic effect with the polybutene or polyisobutylene as Component (B). On the other hand, if this value exceeds 5 parts by weight, the resulting excessive bleeding may cause sticking or give an offensive odor or frequently cause gelation.

Due to its adhesion, the wrapping film of the present invention may cause blocking (phenomenon in which a film wound on a paper tube sticks to itself and thus can be hardly peeled off itself). In order to inhibit blocking, a surface active agent as an additive may be incorporated in the system during the production or film formation of the polyolefin resin composition. Examples of the surface active agent include glycerin $C_{8-22}$ fatty acid esters, sorbitan $C_{8-22}$ fatty acid esters, mono-stearic citrate, di-stearic citrate, tri-stearic citrate, sucrose $C_{8-22}$ fatty acid esters, and pentaerythritol $C_{8-22}$ fatty acid esters. The amount of the surface active agent is generally from 0.1 to 5 parts by weight, preferably from 0.2 to 4 parts by weight, per 100 parts by weight of the polyolefin resin composition.

Examples of the aliphatic polyamide constituting the interlayer in the wrapping film of the present invention include nylon-6, nylon-6,6, nylon-6,10 and nylon-6/6,6 copolymers, and nylon-6/6,10 copolymers. Among these, nylon-6 and nylon-6/6,6 copolymers are preferred.

The wrapping film of the present invention exhibits a tensile elongation at break of 200% or less, preferably 20 to 200%, more preferably 30 to 150% in the direction of film withdrawal and a tensile elongation at break of 80% or more, preferably 80 to 800%, more preferably 100 to 600% in the direction perpendicular to the direction of film withdrawal. The ratio of the tensile elongation at break in the direction of film withdrawal to that in the direction perpendicular to the direction of film withdrawal is in the range of 0.7 or less, preferably 0.07 to 0.7, more preferably 0.08 to 0.65.

If the tensile elongation at break in the direction of film withdrawal exceeds 200%, the film is stretched upon cutting. If the tensile elongation at break in the direction perpendicular to the direction of film withdrawal falls below 80%, the film is subject to longitudinal tear upon cutting.

If the ratio of the tensile elongation at break in the direction of film withdrawal to that in the direction perpendicular to the direction of film withdrawal exceeds 0.7, the film is often subject to oblique tear or longitudinal tear upon cutting.

The present invention will be further described with reference to the process for the preparation of the wrapping film of the present invention. However, the present invention is not construed as being limited thereto.

The formation of the wrapping film of the present invention can be accomplished by using any suitable laminating process to form a non-stretched laminated film comprising an outer layer and inner layer made of the above mentioned polypropylene resin composition and an interlayer made of the above mentioned polyamide resin, and then monoaxially stretching the non-stretched laminated film in the direction of film withdrawal (longitudinal direction).

Examples of the process for the preparation of the non-stretched laminated film (laminating process) include thermal adhesion process, extrusion laminating process, dry laminating process, and co-extrusion process. Particularly preferred among these laminating processes is co-extrusion process.

As the co-extrusion process there can be used T-die extrusion process, air-cooled inflation process or water-cooled inflation process. Preferred among these co-extrusion processes is water-cooled inflation process. In other words, the resin which has been melt-extruded can be quenched by the above mentioned formation process to obtain a film with improved transparency.

The non-stretched multi-layer film thus obtained by the above mentioned co-extrusion process is then monoaxially stretched in the direction of film withdrawal (longitudinal direction) by a factor of 2 to 4.5, preferably 2.5 to 4. If the factor of elongation falls below 2, the tensile elongation at break in the direction of stretching tends to become excessive, making the cuttability of the film insufficient. On the contrary, if the factor of elongation exceeds 4.5, the stretchability of the film tends to be poor, causing break or unevenness in elongation. In the stretching process, the non-stretched film is heated as it is or in the form of slit with a predetermined width while the circumferential speed of, for example, the stretching rolls are altered to stretch the film in the direction of film withdrawal or longitudinal direction. The preheating temperature at the stretching process is generally in the range of not higher than the temperature that is 10° C. lower than the melting point of the polypropylene, preferably 40° to 140° C.

The temperature at which thermal fixing is effected after stretching is higher than the preheating. This temperature is preferably as high as possible to inhibit wrinkle on the film and improve the strength in the transversal direction and is generally in the range of not higher than the temperature that is 10° C. lower than the melting point of the polypropylene resin, preferably 80° to 150° C.

If the preheating temperature and the heat fixing temperature exceed the temperature that is 10° C. lower than the melting point of the polypropylene resin, the film melts and sticks to the stretching rolls. If the preheating temperature falls below 40° C., the aliphatic polyamide resin tends to be insufficiently preheated, making it difficult to stretch the film and causing the film to break.

The thickness of the wrapping film of the present invention is in the range of 40 μm or less, preferably 2 to 30 μm, more preferably 5 to 20 μm. The thickness of the interlayer is in the range of 10 to 90% of the total thickness of the film. If the thickness of the film exceeds 40 μm, the film exhibits excessive tear strength upon cutting and is not suitable for use in wrapping film.

If the thickness of the interlayer falls below 10% of the total thickness of the film, the inherent properties, i.e., heat resistance and mechanical strength, of polyamide resins cannot be maintained, and the inherent properties of monoaxially-oriented polypropylene film are dominant, making the film easily tearable in the direction of stretching. The thickness of the interlayer is preferably in the range of 15% or more of the total thickness of the film. On the contrary, if it exceeds 90% of the total thickness of the film, the thickness of the polypropylene layer becomes less, making it difficult to uniformly cover the interlayer by co-extrusion process. The thickness of the interlayer is preferably 80% or less of the total thickness of the film.

The wrapping film of the present invention essentially consists of at least three resin layers, i.e., outer layer, interlayer and inner layer. The structure of the wrapping film of the present invention may comprise further resin layers. Examples of such a structure comprising 4 or more resin layers include one comprising an adhesion layer interposed between the outer layer and the interlayer or between the inner layer and the interlayer, and one comprising another resin layer provided on the outer surface of the outer layer or on the outer surface of the inner layer.

The adhesion layer may be composed, for example, of polyolefins modified with an unsaturated carboxylic acid or its anhydride, such as maleic anhydride-modified polypropylene. The modification amount is generally from 10 to 10,000 ppm, preferably from 50 to 5,000 ppm. The thickness of the adhesion layer is generally from 1 to 60%, preferably from 3 to 40%, of the total thickness of the wrapping film including the adhesion layer.

Examples of another resin layer provided on the outer surface of the outer or inner layer include a heat-sealing layer composed, for example, of polyethylene. The thickness of the heat-sealing layer is generally from 0.1 time to 10 times, preferably from 0.3 to 5 times, the total thickness of the outer layer, the intermediate layer, the inner layer, and the adhesion layer if any.

A proper adhesion component may be incorporated in each layer to prevent these layers from being peeled off each other while maintaining the 3-layer structure free of adhesion layer. Examples of the adhesion component include those exemplified for the adhesion layer above. The amount of the adhesion component varies depending on the modification amount thereof, and is generally from 0.05 to 50 wt %, preferably from 0.25 to 25 wt %, based on the total amount of the composition for the respective layer when the modification amount is 20,000 ppm.

The present invention will be further described in the following examples, but the present invention should not be construed as being limited thereto.

In the examples, the measurement of various properties were carried out as follows:

(1) Permeability to water vapor

Permeability to water vapor is determined at a temperature of 40° C. and a relative humidity of 90% in accordance with JIS Z 0208. The results are represented in terms of "gmm/m$^2$·24hr".

(2) Transparency (haze value)

Transparency is determined by means of a hazemeter in accordance with JIS K 6714. The results are represented in terms of "%".

(3) Heat resistance

A 10-g weight is suspended from a 30-mm wide and 14-cm long strip-shaped film specimen with a paper applied to both the top and bottom 25-mm portions thereof. The maximum atmosphere temperature at which the specimen cannot be cut for 1 hour under this condition is determined. The measurement is carried out every 10° C.

(4) Percentage thermal shrinkage

A 10-mm diameter disc is punched from the film specimen by means of a punching machine. The disc-shaped film specimen is dipped in a silicone oil in an aluminum pan which is then put on a hot plate. The temperature of the hot plate is then lowered since it has some heat taken away by the aluminum pan. The temperature of the hot plate then recovers to 140° C., and after 45 seconds, the change in the size of the specimen is then determined. The results are represented in terms of "%".

(5) Cuttability

The film is wound on a core tube, and then housed in a case for wrapping film. The specimen is then subjected to cutting test by a cutting blade for 4-level evaluation (excellent, fair, slightly poor, poor). For reference standard, the cuttability level of a commercially available wrapping film is defined as fair.

(6) Adhesion strength

The measurement of the adhesion strength was carried out in accordance with JIS Z 0237. Specifically, two sheets of the film are superimposed on each other. The superimposed films are pressed at a linear pressure of 0.3 kg/cm three times by a roll with a diameter of 25 mm and a width of 150 mm. Within 5 minutes, the films are measured for force required to shear-peel the two sheets of the film and force required to peel the two sheets of the film in the direction of 180° by means of an Instron type tensile machine under the conditions set forth in Table 1.

TABLE 1

| Measurement | Shear peel | 180° peel |
|---|---|---|
| Rate of pulling | 300 mm/min. | 300 mm/min. |
| Clearance between chucks | 50 mm | 50 mm |
| Width of specimen | 25 mm | 50 mm |
| Adhesion area | 25 × 25 mm | 50 × 50 mm |
| Unit of measurements | kg/cm$^2$ | g/50 mm |

(7) Tensile elongation at break

The tensile elongation at break is determined by means of a tensile machine in accordance with JIS K 7127. The results are represented in terms of "%".

EXAMPLES 1 TO 3 AND COMPARATIVE EXAMPLES 1 TO 7

A polypropylene resin (propylene-ethylene random copolymer; MFR: 9.0; density: 0.89 g/cm$^3$) as Component (A), a polybutene ("Nissan Polybutene 5SH" available from Nippon Oils and Fats Co., Ltd.; average molecular weight: 780) as Component (B), and diacetyl monolauryl glycerin as surface active agent as Component (C') were mixed in a blender in a ratio as set forth in Table 2. The material was then pelletized by means of a two-shaft pelletizer with a diameter of 30 mm at an extrusion temperature of 220° C. to prepare a polypropylene resin composition.

5 parts by weight of a maleic anhydride-modified polypropylene were dryblended with 100 parts by the above mentioned polypropylene resin composition. The blend thus obtained and 100 parts by weight of a polyamide resin (nylon-6/6,6 copolymer available from Mitsubishi Chemical Industries Ltd.; "Nobamid 2030") as Component (D) were then co-extruded through a two-component three-layer T-die co-extruder with a width of 450 mm with the former component charged into a 50-mm diameter extruder and the latter component charged into a 40-mm diameter extruder at a die temperature of 280° C., a chill roll temperature of 25° C. and a take-off speed of 20 m/min. to obtain a two-component three-layer film consisting of an outer layer (polypropylene, PP), an interlayer (nylon-6/6,6, NY) and an inner layer (polypropylene, PP). A maleic anhydride-modified polypropylene was incorporated in the system to inhibit the separation of the polypropylene resin composition layer from the nylon layer.

The film thus obtained was then monoaxially stretched by rolls at a preheating temperature of 50° C. and a heat fixing temperature of 110° C. by a predetermined factor of stretching to obtain a multi-layer film. The results are set forth in Table 3.

TABLE 2

| | Composition ratio | | | | Layer ratio PP/ | Factor of stretch- | Thickness |
|---|---|---|---|---|---|---|---|
| | (A) | (B) | (C') | (D) | NY/PP | ing | (μm) |
| Example 1 | 100 | 20 | 0 | 100 | 2/1/2 | 3.0 | 10 |
| Example 2 | 100 | 10 | 0 | 100 | 2/1/2 | 3.0 | 10 |
| Example 3 | 100 | 10 | 2 | 100 | 2/1/2 | 3.0 | 10 |
| Comparative Example 1 | 100 | 10 | 0 | 100 | 5/1/5 | 3.0 | 10 |
| Comparative Example 2 | 100 | 10 | 0 | 0 | 1/0/1 | 3.0 | 10 |
| Comparative Example 3 | 100 | 10 | 0 | 100 | 2/1/2 | 3.0 | 50 |
| Comparative Example 4 | 100 | 10 | 0 | 100 | 2/1/2 | 1.7 | 10 |
| Comparative Example 5 | 100 | 10 | 0 | 100 | 2/1/2 | 5.0 | 10 |
| Comparative Example 6 | 100 | 2 | 0 | 100 | 2/1/2 | 3.0 | 10 |
| Comparative Example 7 | 100 | 35 | 0 | 100 | 2/1/2 | 3.0 | 10 |

TABLE 3

| | Water vapor permeability | Haze | Heat resistant temperature MD/TD | Thermal shrinkage MD/TD | Cuttability | Adhesion strength | | Tensile elongation at break | |
|---|---|---|---|---|---|---|---|---|---|
| | | | | | | Shear peel | 180° peel | MD | TD |
| Example 1 | 0.31 | 0.5 | 180/180 | 28/0 | Excellent | 0.67 | 3.41 | 65 | 466 |
| Example 2 | 0.30 | 0.5 | 180/180 | 26/0 | Excellent | 0.52 | 2.18 | 63 | 483 |
| Example 3 | 0.30 | 0.4 | 180/180 | 26/0 | Excellent | 0.50 | 1.83 | 59 | 482 |
| Comparative Example 1 | 0.26 | 0.3 | 180/180 | — | Poor | 0.55 | 2.27 | 74 | 76 |
| Comparative Example 2 | 0.24 | 0.3 | 160/150 | 45/0 | Poor | 0.57 | 2.43 | 56 | 60 |
| Comparative Example 3 | 0.30 | 1.4 | 180/180 | 26/0 | Slightly poor | 0.53 | 2.06 | 71 | 504 |
| Comparative Example 4 | 0.34 | 0.5 | 180/180 | 10/0 | Slightly poor | 0.44 | 1.71 | 214 | 422 |
| Comparative Example 5 | — | — | — | — | — | — | — | — | — |

TABLE 3-continued

|  | Water vapor permeability | Haze | Heat resistant temperature MD/TD | Thermal shrinkage MD/TD | Cuttability | Adhesion strength | | Tensile elongation at break | |
|---|---|---|---|---|---|---|---|---|---|
|  |  |  |  |  |  | Shear peel | 180° peel | MD | TD |
| Comparative Example 6 | 0.27 | 0.4 | 180/180 | 24/0 | Excellent | 0.17 | 1.03 | 60 | 513 |
| Comparative Example 7 | 0.31 | 0.6 | 180/180 | 29/0 | Excellent | 0.92 | 5.60 | 50 | 482 |

Note:
MD: mechanical direction, or longitudinal direction
TD: transversal direction, or lateral direction
Comparative Examples 1, 2: Longitudinal tear occurred during cuttability test
Comparative Example 3: Hardly cut due to case deformation caused by great force required
Comparative Example 4: Some poorly cuttable due to slight elongation
Comparative Example 5: Break occurred during monoaxial stretching, disabling sampling

EXAMPLES 4 TO 7 AND COMPARATIVE EXAMPLES 8 TO 13

A propylene-ethylene random copolymer (MFR: 9.0; density: 0.89 g/cm$^3$; "Mitsubishi Polypro 6500J" available from Mitsubishi Chemical Industries Ltd.) as polypropylene resin of Component (A), a polybutene ("Nissan Polybutene 015SH" available from Nippon Oils and Fats Co., Ltd.; average molecular weight: 580) as Component (B), and diglycerin monooleate (available from Riken Vitamin K.K.) as Component (C) were mixed in a blender in a ratio as set forth in Table 4. The material was then pelletized by means of a two-shaft pelletizer with a diameter of 30 mm at an extrusion temperature of 220° C. to prepare a polypropylene resin composition.

5 parts by weight of a maleic anhydride-modified polypropylene were dryblended with 100 parts by the above mentioned polypropylene resin composition. The blend thus obtained and an aliphatic polyamide resin (nylon-6/6,6 copolymer available from Mitsubishi Chemical Industries Ltd.) as Component (D) were then co-extruded through a two-component three-layer T-die co-extruder with a width of 450 mm with the former component charged into a 50-mm diameter extruder and the latter component charged into a 40-mm diameter extruder in an amount as set forth in Table 4 at a die temperature of 270° C., a chill roll temperature of 25° C. and a take-off speed of 20 m/min. to obtain a two-component three-layer film consisting of an outer layer (polypropylene resin composition), an interlayer (nylon-6/6,6) and an inner layer (polypropylene resin composition). A maleic anhydride-modified polypropylene was incorporated in the system to inhibit the separation of the polypropylene resin composition layer from the nylon layer.

The film thus obtained was then monoaxially stretched by rolls at a preheating temperature of 60° C. and a heat fixing temperature of 120° C. by a factor of stretching as set forth in Table 4 to obtain a multi-layer film with a thickness of 10 µm.

The film thus obtained was then measured for water vapor permeability, transparency, heat resistant temperature, thermal shrinkage, cuttability, adhesion strength, and tensile elongation at break. The results are set forth in Table 5.

|  | Composition ratio | | | | Layer ratio | Factor of |
|---|---|---|---|---|---|---|
|  | (A) | (B) | (C) | (D) | PP/NY/PP | stretching |
| Example 4 | 100 | 12 | 0 | 100 | 2/1/2 | 3.0 |
| Example 5 | 100 | 12 | 1 | 100 | 2/1/2 | 3.0 |
| Example 6 | 100 | 12 | 2 | 100 | 2/1/2 | 3.0 |
| Example 7 | 100 | 14 | 1 | 100 | 2/1/2 | 3.0 |
| Comparative Example 8 | 100 | 12 | 6 | 100 | 2/1/2 | — |
| Comparative Example 9 | 100 | 2 | 2 | 100 | 2/1/2 | 3.0 |
| Comparative Example 10 | 100 | 35 | 2 | 100 | 2/1/2 | 3.0 |
| Comparative Example 11 | 100 | 12 | 2 | 100 | 2/1/2 | 5.0 |
| Comparative Example 12 | 100 | 12 | 2 | 100 | 2/1/2 | 1.7 |
| Comparative Example 13 | 100 | 12 | 2 | 100 | 5/1/5 | 3.0 |

TABLE 5

|  | Water vapor permeability | Haze | Heat resistant temperature MD/TD | Thermal shrinkage MD/TD | Cuttability | Adhesion strength | | Tensile elongation at break | |
|---|---|---|---|---|---|---|---|---|---|
|  |  |  |  |  |  | Shear peel | 180° peel | MD | TD |
| Example 4 | 0.29 | 0.8 | 180/180 | 17/0 | Excellent | 0.49 | 2.8 | 51 | 468 |
| Example 5 | 0.31 | 0.7 | 180/180 | 18/0 | Excellent | 0.51 | 1.5 | 44 | 460 |
| Example 6 | 0.30 | 0.4 | 180/180 | 18/0 | Excellent | 0.57 | 1.7 | 57 | 470 |
| Example 7 | 0.30 | 0.7 | 180/180 | 19/0 | Excellent | 0.95 | 2.0 | 50 | 440 |
| Comparative Example 8 | — | — | — | — | — | — | — | — | — |
| Comparative Example 9 | 0.30 | 0.9 | 180/180 | 15/0 | Excellent | 0.14 | 0.93 | 50 | 444 |
| Comparative Example 10 | 0.34 | 0.5 | 180/180 | 20/0 | Excellent | 1.9 | 5.1 | 47 | 509 |
| Comparative Example 11 | — | — | — | — | — | — | — | — | — |
| Comparative Example 12 | 0.33 | 0.6 | 180/180 | 10/0 | Slightly poor | 0.57 | 1.7 | 223 | 451 |
| Comparative Example 13 | 0.26 | 0.8 | 170/170 | 25/0 | Poor | 0.61 | 1.9 | 71 | 73 |

In Comparative Example 8, ribs were developed in the raw film due to the incorporation of excess monoglyceride, making it impossible to obtain an excellent film. Thus, Comparative Example 8 could not be evaluated for physical properties of film. In Comparative Example 11, break occurred during stretching, disabling sampling. Thus, Comparative Example 11 could not be evaluated for physical properties of film.

Comparative Example 12 exhibited a slightly poor cuttability since the film slightly extended and could hardly be cut. Comparative Example 13 also exhibited a slightly poor cuttability since the film underwent longitudinal tear.

EXAMPLES 8 to 10 and COMPARATIVE EXAMPLES 14 TO 19

A propylene-ethylene random copolymer (MFR: 9.0; density: 0.89 g/cm$^3$; available from Mitsubishi Chemical Industries Ltd.) as polypropylene resin as Component (A), a polybutene (available from Nippon Oils and Fats Co., Ltd.; average molecular weight: 780) as Component (B), and monolauryl glycerin as Component (C) were mixed in a blender in a ratio as set forth in Table 6. The material was then pelletized by means of a two-shaft pelletizer with a diameter of 30 mm at an extrusion temperature of 220° C. to prepare a polypropylene resin composition.

5 parts by weight of a maleic anhydride-modified polypropylene were dryblended with 100 parts by the above mentioned polypropylene resin composition. The blend thus obtained and 100 parts by weight of a polyamide resin (nylon-6/6,6 copolymer available from Mitsubishi Chemical Industries Ltd.) as Component (D) were then co-extruded through a two-component three-layer T-die co-extruder with a width of 450 mm with the former component charged into a 50-mm diameter extruder and the latter component charged into a 40-mm diameter extruder at a die temperature of 270° C., a chill roll temperature of 250° C. and a take-off speed of 20 m/min. to obtain a two-component three-layer film consisting of an outer layer (polypropylene resin composition), an interlayer (nylon-6/6,6) and an inner layer (polypropylene resin composition). A maleic anhydride-modified polypropylene was incorporated in the system to inhibit the separation of the polypropylene resin composition layer from the nylon layer.

The film thus obtained was then monoaxially stretched by rolls at a preheating temperature of 50° C. and a heat fixing temperature of 110° C. by a factor of stretching as set forth in Table 6 to obtain a multi-layer film with a thickness of 10 μm.

The film thus obtained was then measured for water vapor permeability, transparency, heat resistant temperature, thermal shrinkage, cuttability, adhesion strength, and tensile elongation at break. The results are set forth in Table 7.

TABLE 6

|  | Composition ratio | | | | Layer ratio | Factor of |
|---|---|---|---|---|---|---|
|  | (A) | (B) | (C) | (D) | PP/NY/PP | stretching |
| Example 8 | 100 | 20 | 1 | 100 | 2/1/2 | 3.0 |
| Example 9 | 100 | 10 | 1 | 100 | 2/1/2 | 3.0 |
| Example 10 | 100 | 10 | 2 | 100 | 2/1/2 | 3.0 |
| Comparative Example 14 | 100 | 10 | 6 | 100 | 2/1/2 | — |
| Comparative Example 15 | 100 | 2 | 2 | 100 | 2/1/2 | 3.0 |
| Comparative Example 16 | 100 | 35 | 2 | 100 | 2/1/2 | 3.0 |
| Comparative Example 17 | 100 | 10 | 2 | 100 | 2/1/2 | 5.0 |
| Comparative Example 18 | 100 | 10 | 2 | 100 | 2/1/2 | 1.7 |
| Comparative Example 19 | 100 | 10 | 2 | 100 | 5/1/5 | 3.0 |

TABLE 7

|  | Water vapor permeability | Haze | Heat resistant temperature MD/TD | Thermal shrinkage MD/TD | Cuttability | Adhesion strength | | Tensile elongation at break | |
|---|---|---|---|---|---|---|---|---|---|
|  |  |  |  |  |  | Shear peel | 180° peel | MD | TD |
| Example 8 | 0.31 | 0.7 | 180/180 | 18/0 | Excellent | 0.68 | 3.40 | 56 | 433 |
| Example 9 | 0.30 | 0.7 | 180/180 | 18/0 | Excellent | 0.53 | 2.14 | 61 | 481 |
| Example 10 | 0.4 | 0.4 | 180/180 | 18/0 | Excellent | 0.59 | 1.83 | 52 | 457 |
| Comparative Example 14 | — | — | — | — | — | — | — | — | — |
| Comparative Example 15 | 0.30 | 0.9 | 180/180 | 15/0 | Excellent | 0.14 | 0.93 | 54 | 502 |
| Comparative Example 16 | 0.34 | 0.5 | 180/180 | 20/0 | Excellent | 1.08 | 5.11 | 63 | 448 |
| Comparative Example 17 | — | — | — | — | — | — | — | — | — |
| Comparative Example 18 | 0.33 | 0.6 | 180/180 | 10/0 | Slightly poor | 0.57 | 1.75 | 227 | 410 |
| Comparative Example 19 | 0.26 | 0.8 | 170/170 | 25/0 | Poor | 0.61 | 1.94 | 73 | 72 |

In Comparative Example 14, ribs were developed in the raw film due to the incorporation of excess monoglyceride, making it impossible to obtain an excellent film. Thus, Comparative Example 14 could not be evaluated for physical properties of film. In Comparative Example 17, break occurred during stretching, disabling sampling. Thus, Comparative Example 17 could not be evaluated for physical properties of film.

Comparative Example 18 exhibited a slightly poor cuttability since the film slightly extended and could hardly be cut. Comparative Example 19 also exhibited a slightly poor cuttability since the film underwent longitudinal tear.

As mentioned above, the wrapping film of the present invention is excellent in cuttability, transparency, heat resistance, adhesion, water vapor barrier properties, and anti-heat shrinkage properties. Further, the bleeding of ε-caprolactam, which is a starting monomer for nylon-6 and its copolymer nylon, to the surface of the film can be inhibited by the lamination of a polypropylene resin. Thus, the wrapping film of the present invention is excellent in food sanitation. Therefore, the wrapping film of the present invention is particularly useful as food wrapping stretched film, other wrapping films, etc.

While the invention has been described in detail and with reference to specific embodiments thereof, it will be apparent to one skilled in the art that various changes and modifications can be made therein without departing from the spirit and scope thereof.

What is claimed is:

1. A wrapping film comprising at least an outer layer, an interlayer, and an inner layer in this order,
    (a) said wrapping film having a shear peel strength of 0.40 kg/cm² or more and a 180° peel strength of 4.0 g/50 mm or less,
    (b) said outer layer and said inner layer each being a polyolefin resin composition layer,
    (c) said interlayer being an aliphatic polyamide resin layer, and
    (d) the total thickness of said wrapping film being in the range of 40 μm or less, and the thickness of said interlayer being in the range of 10 to 90% of the total thickness of said wrapping film.

2. A wrapping film as claimed in claim 1, wherein the content of (B) polybutene-1 or polyisobutylene is 5 to 20 parts by weight.

3. A wrapping film as claimed in claim 1, wherein the number-average molecular weight of (B) polybutene-1 or polyisobutylene is in the range of 400 to 3,000.

4. A wrapping film as claimed in claim 1, wherein the total thickness of said wrapping film is 2 to 30 μm.

5. A wrapping film as claimed in claim 1, wherein a polyolefin resin composition contained in said outer layer and said inner layer has a melt flow rate of 0.5 to 20 g/10 min., and a density of 0.89 to 0.91 g/cm³.

6. A wrapping film as claimed in claim 1, wherein said wrapping film is obtained by stretching a laminated film comprising said outer layer, said intermediate layer and said inner layer in the direction of film withdrawal by a factor of 2 to 4.5.

7. A wrapping film as claimed in claim 6, wherein said polyolefin resin composition contained in said outer layer and said inner layer is a polypropylene resin composition comprising (A) 100 parts by weight of a polypropylene resin and (B) 3 to 30 parts by weight of a polybutene-1 or polyisobutylene.

8. A wrapping film as claimed in claim 7, wherein the content of (B) of polybutene-1 or polyisobutylene is 5 to 20 parts by weight.

9. A wrapping film as claimed in claim 7, wherein the number-average molecular weight of (B) polybutene-1 or polyisobutylene is in the range of 400 to 3,000.

10. A wrapping film as claimed in claim 1, wherein said polyolefin resin composition contained in said outer layer and said inner layer is a polypropylene resin composition comprising (A) 100 parts by weight of a polypropylene resin and (B) 3 to 30 parts by weight of a polybutene-1 or polyisobutylene.

11. A wrapping film as claimed in claim 10, wherein the content of (B) polybutene-1 or polyisobutylene is 5 to 20 parts by weight.

12. A wrapping film as claimed in claim 10, wherein the number-average molecular weight of (B) polybutene-1 or polyisobutylene is in the range of 400 to 3,000.

13. A wrapping film as claimed in claim 6, wherein said polyolefin resin composition contained in said outer layer and said inner layer is a polypropylene resin composition comprising (A) 100 parts by weight of a polypropylene resin, (B) 3 to 30 parts by weight of a polybutene-1 or polyisobutylene, and (C) 0.2 to 5 parts by weight of a polyglycerin aliphatic ester.

14. A wrapping film as claimed in claim 13, wherein the content of (B) polybutene-1 or polyisobutylene is 5 to 20 parts by weight.

15. A wrapping film as claimed in claim 13, wherein the number-average molecular weight of (B) polybutene-1 or polyisobutylene is in the range of 400 to 3,000.

16. A wrapping film as claimed in claim 6, wherein said polyolefin resin composition contained in said outer layer and said inner layer is a polypropylene resin composition comprising (A) 100 parts by weight of a polypropylene resin, (B) 3 to 30 parts by weight of a polybutene-1 or polyisobutylene, and (C) 0.2 to 5 parts by weight of a monoglyceride containing a $C_{8-22}$ acyl group.

17. A wrapping film as claimed in claim 16, wherein the content of (B) polybutene-1 or polyisobutylene is 5 to 20 parts by weight.

18. A wrapping film as claimed in claim 16, wherein the number-average molecular weight of (B) polybutene-1 or polyisobutylene is in the range of 400 to 3,000.

19. A wrapping film comprising at least an outer layer, an interlayer, and an inner layer, in this order,
    (a) said wrapping film having a shear peel strength of 0.40 kg/cm² or more and a 180° peel strength of 4.0 g/50 mm or less,
    (b) said outer layer and said inner layer each being a polyolefin resin composition layer, wherein a polyolefin resin composition contained in said outer layer and said inner layer comprises (A) 100 parts by weight of a polypropylene resin, (B) 3 to 30 parts by weight of a polybutene-1 or polyisobutylene, and (C) 0.2 to 5 parts by weight of a polyglycerin aliphatic ester;
    (c) said interlayer being an aliphatic polyamide resin layer, and
    (d) the total thickness of said wrapping film being in the range of 40 μm or less, and the thickness of said interlayer being in the range of 10 to 90% of the total thickness of said wrapping film.

20. A wrapping film comprising at least an outer layer, an interlayer, and an inner layer in this order,
    (a) said wrapping film having a shear peel strength of 0.40 kg/cm² or more and a 180° peel strength of 4.0 g/50 mm or less,
    (b) said outer layer and said inner layer each being a polyolefin resin composition layer, wherein a polyolefin resin composition contained in said outer layer and said inner layer comprises (A) 100 parts by weight of a polypropylene resin, (B) 3 to 30 parts by weight of a polybutene-1 or polyisobutylene, and (C) 0.2 to 5 parts by weight of a monoglyceride containing a $C_{8-22}$ acyl group;
    (c) said interlayer being an aliphatic polyamide resin layer, and
    (d) the total thickness of said wrapping film being in the range of 40 μm or less, and the thickness of said interlayer being in the range of 10 to 90% of the total thickness of said wrapping film.

* * * * *